United States Patent [19]
Gottesman

[11] Patent Number: 6,128,764
[45] Date of Patent: Oct. 3, 2000

[54] QUANTUM ERROR-CORRECTING CODES AND DEVICES

[75] Inventor: Daniel Gottesman, Los Alamos, N. Mex.

[73] Assignee: California Institute of Technology, Pasadena, Calif.

[21] Appl. No.: 09/019,149

[22] Filed: Feb. 6, 1998

Related U.S. Application Data

[60] Provisional application No. 60/037,444, Feb. 6, 1997.

[51] Int. Cl.$^7$ .................................................. H03M 13/00
[52] U.S. Cl. ............................................ 714/785; 714/785
[58] Field of Search .................................. 380/4; 714/785

[56] References Cited

U.S. PATENT DOCUMENTS 5,768,297  6/1998  Shor ........................................ 714/763

OTHER PUBLICATIONS

Schulman, L. S., Bounds On Decoherence and Error, Phusics Department, Clarkson University, pp. 1–10, Jan. 23, 1997.

Bennett et al., Mixed–States entanglement and quantum error correction, pp. 3824–3851, Nov. 1996.

Steane, Andrew, Multiple Particle Interference and Quantum Error Correction, Clarendon Laboratory, Parks Road, Oxford, OX1 3PU, England, pp. 1 to 45, May 13, 1996.

Shor, W.P. et al., Qyantum Error–Correcting Codes Need not Completely Reveal the Error Syndrome, University of Califorina at Los Angeles, pp. 1 to 13, 1995.

Shor, Peter W., Fault–Tolerant Quantum Computation, IEEE, pp. 56 to 65, 1996.

Yao, Andrew, Department of Computer Science, Princeton University, IEEE, pp. 352 to 361, 1993.

American Association For the Advancement of Science, *Science*, vol. 275, pp. 350–356, Jan. 17, 1997, "Bulk Spin–Resonance Quantam Computation", Neil A. Gerenfeld and Isaas L. Chuang.

Cirac, J.I., et al., "Quantum Computations with Cold Trapped Ions," *Physical Review Letters*, vol. 74, No. 20, pp. 4091–4094, May 15, 1995.

Shor, P.W., "Scheme for reducing decoherence in quantum computer memory," *Physical Review A: Atomic. Molecular, and Optical Physics*, vol. 52, No. 4, pp. R2493–R2496, Oct. 1995.

Monroe, C., et al., "Demonstration of a Fundamental Quantum Logic Gate," *Physical Review Letters*, vol. 75, No. 25, pp. 4714–4717, Dec. 18, 1995.

Turchette, Q.A., et al, "Measurement of Conditional Phase Shifts for Quantum Logic,"*Physical Review Letters*, vol. 75, No. 25, pp. 4710–4713, Dec. 18, 1995.

Steane, A.M., "Error Correcting Codes in Quantum Theory," *Physical Review Letters*, vol. 77, No. 5, pp. 793–797, Jul. 29, 1996.

Muller, A., et al., "Plug and play' systems for quantum cryptography," *Appl. Phys. Lett.*, vol. 70, No. 7, Feb. 17, 1997.

*Primary Examiner*—Albert De Cady
*Assistant Examiner*—Shelly A Chase
*Attorney, Agent, or Firm*—Fish & Richardson P.C.

[57] ABSTRACT

A method of forming quantum error-correcting codes by first forming a stabilizer for a Hilbert space. A quantum information processing device can be formed to implement such quantum codes.

19 Claims, 3 Drawing Sheets

QUANTUM ERROR-CORRECTING CODES AND DEVICES

This application claims the benefit of U.S. Provisional Application No. 60/037,444 filed on Feb. 6, 1997, which is incorporated herein by reference.

STATEMENT AS TO FEDERALLY SPONSORED RESEARCH

The U.S. Government has certain rights in this invention pursuant to Grant No. DE-FG03-92-ER40701 awarded by the Department of Energy.

FIELD OF THE INVENTION

The present invention relates to error detection and correction in transmission and retrieval of digital data, and more specifically, to quantum error-correcting codes and devices.

BACKGROUND OF THE INVENTION

Digital data in electronic devices and systems is often subject to noise and disturbances when transported through various data channels. Such data channels may include a data transmission line, a wireless link (e.g., an RF or optical link), or a storage medium (e.g., a CDROM). Data that is transmitted in telephone lines, for example, may be disturbed by thermal noise or lightning. Data stored on a magnetic medium such as a floppy disk may contain errors caused by defects in the disk. Therefore, data may not be perfectly reproduced by these data channels.

Error-correcting codes have been developed and used in various data communication systems to mitigate this problem. Source information data is encoded to form encoded data ("code words") based on a set of error-correcting codes. The encoded data has additional digits that are used to detect and correct errors. The encoded data is then transmitted through a noisy data channel and is decoded at a receiving end to recover the original source information data.

Design of proper error-correcting codes to achieve certain error-correcting capability is a complex and formidable task. Many classical coding techniques use linear codes. A pack of k-bit data is encoded to form code words of n bits (n>k) in word length. The k-bit data may be represented by a k-dimensional binary vector $\upsilon$. A generator matrix G can be formed according to a coding algorithm so that $G\upsilon$ is the coded data. The columns of G form a basis for the k-dimensional coding subspace of the n-dimensional binary vector space and represent basis code words. The name "linear" is used since a general code word can be an arbitrary linear combination of the basis code words.

Quantum-mechanical systems have been investigated for information processing such as quantum computation and quantum cryptography. A suitable quantum system has an ensemble of subsystems with two quantum states where subsystems are strongly correlated due to non-local quantum coherence. Each two-state subsystem is called a quantum bit ("qubit"). Information can be represented, stored, processed, and transmitted by superposition and correlation of different qubits. Such quantum information processing systems may outperform electronic computers in certain tasks such as prime factorization problems.

Many implementations of qubits have been proposed or demonstrated. For example, the ground and excited states of ions trapped in a linear ion trap can be used to form quantum logic gates. Interaction between trapped ions can be realized by a joint vibrational mode. Cirac and Zoller, "Quantum computations with cold trapped ions," Phys. Rev. Lett. 74, pp. 4091–4094 (1995) and Monroe et al. "Demonstration of a fundamental quantum logic gate," Phys. Rev. Lett., 75, pp. 4714–4717 (1995). Quantum logic gates can also be formed by polarization of photons in cavity quantum electrodynamics systems. Turchette et al., "Measurement of conditional phase shifts for quantum logic," Phys. Rev. Lett., 75, pp. 4710–4713 (1995). Furthermore, nuclear-spin states in polymers are used to form quantum logic gates in which the interactions are provided by nuclear magnetic resonance. Gershenfeld and Chuang, "Bulk spin resonance quantum computation," Science 275, pp. 350(1995).

These and other quantum systems are susceptible to perturbation caused by environment, measurement and other factors. Entangled states are in general delicate and may be easily corrupted by any external perturbation to become less entangled states. Hence, perturbation causes errors since data are represented by the entangled states. One solution uses quantum error-correcting codes similar to the error-correcting codes in the classical computers or electronic data processors.

However, many classical error-correcting coding techniques cannot be directly applied to quantum systems. Classical coding techniques assume all of the data bits can be precisely measured. Such measurement cannot be performed in quantum systems since any entanglement between qubits would be destroyed. Further, classical computers only need to preserve the bit values of 0 and 1 but quantum systems need to keep both relative amplitude and phase of entangled states due to the quantum coherence. Therefore, quantum error-correcting codes require different design approaches from their classical counterparts.

Shor disclosed a quantum error-correcting code to represent data in 9 qubits for correcting a single bit error in "Scheme for reducing decoherence in quantum memory," Phys. Rev. A52, pp. R2493–R2496(1995). Steane discovered another quantum error-correcting code based on qubits in two mutually rotated bases. See, Steane, "Error correcting codes in quantum theory," Phys. Rev. Lett. 77, pp. 793–797 (1996).

SUMMARY OF THE INVENTION

The present disclosure describes formation of quantum error-correcting codes based on a set of operators. A complete set of basis operators is selected to act on quantum states in a Hilbert space and a coding subspace. Error syndromes for the operators corresponding to errors up to a specified length are specified or selected. Then operators of a stabilizer for the coding subspace are determined based on the error syndromes. The operators of the stabilizer act on a plurality of different seed quantum states (e.g., quasi-classical states) to generate basis states for the coding subspace. Code words are formed by these basis states and/or any linear combination thereof.

One class of quantum error-correcting codes encodes $k=n-j-2$ qubits in $n=2^j$ qubits for correcting 1 error based on Pauli's matrices. The additional (j+2) qubits provide redundancy that is necessary to detect and correct errors.

One advantage of these codes is the capability of correcting any single error in a block of arbitrarily large size. Another advantage is that the codes can be configured to saturate the quantum Hamming bound so as to provide high encoding efficiency.

A quantum information processing device can be built to implement such stabilizer-based codes. One embodiment includes a medium having multiple quantum subsystems, a control module that controls the entanglement of the quantum subsystems according to the stabilizer-based codes, and a detection module for measuring the quantum states.

These and other embodiments, aspects and advantages of the invention will become more apparent in light of the following detailed description, including the accompanying drawings and appended claims.

DETAILED DESCRIPTION OF THE INVENTION

Figure 1:
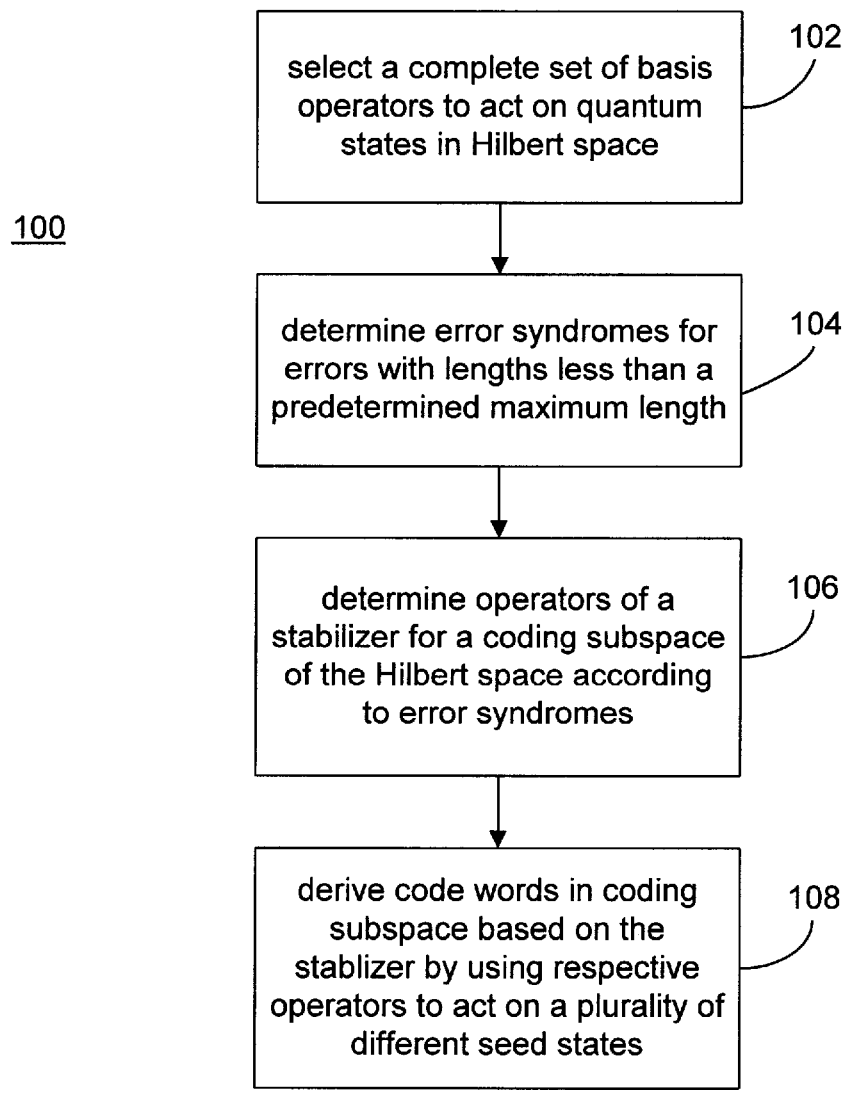
FIG. 1 is a flowchart showing operation steps in forming a quantum error-correcting code.

Certain technical details related to various aspects of the invention are well established and disclosed elsewhere. For details regarding quantum mechanics, see, Cohen-Tannoudji et. al, "Quantum Mechanics,", Volumes 1 and 2, Wiley, New York (1977); for details regarding error-correcting codes, see, MacWilliams and Sloane, "The Theory of Error-Correcting Codes", North-Holland Publishing Company, New York (1977). In addition, certain aspects of the invention have been described in Gottesman, "A class of quantum error-correcting codes saturating the quantum Hamming bound," Physical Review, A54, pp. 1862–1868 (1996) and "Stabilizer codes and quantum error correction," a doctoral dissertation by Gottesman, California Institute of Technology (1997).

A quantum channel for storing, processing or transporting information in qubits is generally noisy but should be able to preserve at least some degree of quantum coherence. Such a quantum channel may be a communication channel, the passage of time as a set of qubits interacts with its environment, or operation of a noisy quantum gate on some qubits. An input of a pure quantum state to the channel can produce a mixed state at the output as the data qubits become entangled with the environment. Even when a pure state is produced at the output of the channel, the output may not be the same pure state as the input. An output of a quantum channel is in general a superposition of pure states. If each of the pure states can be corrected back to the original input state, the output mixed state is also corrected.

The quantum error-correcting codes presented in this disclosure form the quantum states in a linear subspace of a Hilbert space. In general, a code for encoding k qubits in n qubits (n>k) has $2^k$ basis code words corresponding to the basis of the original states. Any linear combination of these basis code words is also a valid codeword corresponding to the same linear combination of the unencoded basis states. The valid code words forms a $2^n$-dimensional Hilbert space, which is a complete and complex inner product space. Due to the linearity of a code, if a set of basis errors can be corrected, any linear combination of the basis errors can also be corrected.

The quantum state ket vectors $|\psi_i\rangle$ of the original $2^k$ basis states form a basis for the space of code words. When a coherent error occurs, the code states are altered by a linear transformation M:

$$|\psi_i\rangle \rightarrow M|\psi_i\rangle, \quad (1)$$

where the operator M is not necessarily unitary, thus M may include incoherent errors. Typically, errors that act on no more than t qubits are considered. An error of length t acts non-trivially on exactly t qubits.

In order for a code to correct two errors $E_a$ and $E_b$, the error $E_a$ acting on one basis code word $|\psi_i\rangle$ should be distinguishable from the error $E_b$ acting on a different basis code word $|\psi_j\rangle$ ($i \neq j$). This can be achieved only if $E_a|\psi_i\rangle$ and $E_b|\psi_j\rangle$ are orthogonal to each other:

$$\langle\psi_i|E_a^\dagger E_b|\psi_j\rangle = 0. \quad (2)$$

Otherwise, $E_a$ and $E_b$ may be mixed. Equation (2) is insufficient to guarantee that a code would work as a quantum error-correcting code. When a measurement is made to detect an error, the actual state of the code within the coding space should not be measured; otherwise superpositions of the basis states would be disturbed. The information about the error is obtained by measuring $\langle\psi_i|E_a^\dagger E_b|\psi_j\rangle$ for all possible errors $E_a$ and $E_b$. Hence, $\langle\psi_i|E_a^\dagger E_b|\psi_j\rangle$ is required to be the same for all the basis code words:

$$\langle\psi_i|E_a^\dagger E_b|\psi_j\rangle = C_{ab}\delta_{ij}, \quad (3)$$

where $C_{ab}$ is independent of i and j, $\delta_{ij}=1$ when i=j, and $\delta_{ij}=0$ when $i \neq j$. See, Knill and Laflamme, "A theory of quantum error-correcting codes," Phys. Rev. A55, pp. 900 (1997) and Benett et al., "Mixed state entanglement and quantum error correction," Phys. Rev. A54, pp. 1745R (1996), which are incorporated herein by reference. It can be shown that Equation (3) is a necessary and sufficient condition for a code to correct the errors $\{E_a\}$.

An error-correction process can be modeled by a unitary linear transformation that entangles the erroneous states $M|\psi_i\rangle$ with a specified known ancilla state $|A\rangle$ to transform the combination into a corrected state:

$$(M|\psi_i\rangle) \otimes |A\rangle \rightarrow |\psi_i\rangle \otimes |A_M\rangle, \quad (4)$$

where the ancilla states $|A_M\rangle$ that are newly created by the transformation include the information about the errors in $M|\psi_i\rangle$. The mapping from M to $|A_M\rangle$ should be linear, but not necessarily one-to-one. If the mapping is injective (i.e., one to one), the respective quantum code is non-degenerate; otherwise, the code is degenerate. A degenerate code has two or more linearly independent matrices that act in a linearly dependent way on the code words. In a non-degenerate code, all of the errors acting on the code words produce linearly independent states.

The transformation in Equation (4) allows for measuring the ancilla preparatory to restoring it to its original state without disturbing the states $|\psi_i\rangle$. This process can correct the error even if the original state is a superposition of the basis states:

$$\left(M \sum_{i=1}^{2^Q} C_i \left|\Psi_i\right\rangle\right) \otimes \left|A\right\rangle \mapsto \left(\sum_{i=1}^{2^Q} C_i \left|\Psi_i\right\rangle\right) \otimes \left|A_M\right\rangle. \quad (5)$$

The above process corrects all coherent errors. Incoherent errors can also be corrected in this way since any incoherent error can be modeled as an ensemble of coherent errors. After the ancilla is measured and restored to its original state, the system is once again in a pure state. While errors acting on different code words must produce orthogonal results, different errors acting on the same code word can produce non-orthogonal states, even in the non-degenerate case.

Suppose an orthonormal basis state is chosen for the ancilla states $|A_M\rangle$. Each basis state corresponds to one or more matrices $M_1$, which form a basis for the space of t-qubit errors. If the code is non-degenerate, each ancilla state has one matrix; if the code is degenerate, at least one ancilla state has two or more corresponding matrices. For simplicity, the code is assumed to be non-degenerate in the following description.

Since there are 3 possible non-trivial 1-qubit errors, the number of possible errors M of length L on an n-qubit code is $$3^L \binom{n}{L}. \tag{6}$$

Each of the states $M|\psi_i\rangle$ should be linearly independent, and all of these different errors fit into the $2^n$-dimensional Hilbert space of the n qubits. Thus, for a code that can correct up to t errors, the following condition known as "Hamming bound" applies:

$$2^k \sum_{t=0}^{t} 3^L \binom{n}{L} \leq 2^n. \tag{7}$$

For n much larger than 1, Equation (7) can be reduced to $$\frac{k}{n} \leq 1 - \frac{t}{n}\log_2 3 - H(t/n), \tag{8}$$

where $H(x) = -x \log_2 x - (1-x)\log_2(1-x)$.

The efficiency of a quantum code can be measured by the ratio k/n. In correcting t-qubit errors for k qubits, a quantum code should be designed to make the n small in order to reduce the required computation. Preferably, a code should saturate the Hamming bound as defined in Equations (7) and (8). For example, the Hamming bound in Equation (4) requires $n \geq 5$ for $t=1$ and $k=1$. Hence, a code with $n=5$ would saturate the bound. Exemplary quantum codes for $t=1$ and $n=2^j$ with $k=n-j-2$ as disclosed below saturate the Hamming bound. In particular, for large n, the efficiency k/n of these codes is high and approaches 1. In this sense, these codes are an analog of the classical Hamming codes.

Many sets of operators may be used as the basis operators for a group that acts on the Hilbert space in constructing a quantum code. One possible basis set is tensor products of the following matrices that relate to the Pauli matrices:

$$X = \begin{pmatrix} 0 & 1 \\ 1 & 0 \end{pmatrix}, Y = \begin{pmatrix} 0 & -1 \\ 1 & 0 \end{pmatrix}, Z = \begin{pmatrix} 1 & 0 \\ 0 & -1 \end{pmatrix}; \tag{9}$$

and an identity matrix I $$I = \begin{pmatrix} 1 & 0 \\ 0 & 1 \end{pmatrix}. \tag{10}$$

The operators X, Y, Z, and I form a complete basis so that any operator may be expressed in a linear combination of products of these operators and respective basis states. In the following description, operators X, Y, Z, and I will be used. It should be understood that any other complete sets of operators with similar algebraic properties may also be used to implement the invention.

Properties of the Pauli matrices are known in quantum mechanics. Similar to the Pauli matrices, each of the above matrices X, Y, and Z is Hermitian, i.e., each matrix is identical to its complex conjugate transpose. As a result, the eigenvalues of the matrices are real. In addition, the matrices X, Y, and Z anticommute with one another:

$$\{X, Y\} = XY + YX = 0; \tag{11}$$

$$\{X, Z\} = XZ + ZX = 0;$$

$$\{Z, Y\} = ZY + YZ = 0.$$

The identity matrix I commutes with any other matrices in the basis, $[I,\sigma] = I\sigma - \sigma I = 0$, where $\sigma$ represents X, Y, and Z. Thus, all of the matrices either commute or anticommute with one another. In addition, the following condition applies to the basis:

$$Y = -ZX = XZ, \tag{12}$$

and $$X^2 = -Y^2 = Z^2 = I. \tag{13}$$

Two non-commuting operators (e.g., X, Y, and Z) cannot be diagonalized simultaneously. According to quantum mechanics, such non-commuting operators cannot be simultaneously measured since measuring one will disturb the eigenvectors of the other.

The basis with X, Y, Z, and I can be used to construct a specific class of quantum codes for $t=1$ and $n=2^j$ with $k=n-j-2$. Let $X_i$, $Y_i$, and $Z_i$ be the matrices X, Y, and Z when they act on the ith qubit in a n-qubit system ($i=1, 2, \ldots, n$). Hence, there are a total of 3n matrices $X_i$, $Y_i$, and $Z_i$. All 3n of these matrices generate a group $\mathcal{G}$. For $n=1$, $\mathcal{G}$ is the symmetry group $D_4$ of a square. For large n (e.g., much greater than 1), $\mathcal{G}$ is $(D_4)^n/(Z_2)^{n-1}$ where $Z_2$ is a binary space of 0s and 1s. According to Equations (12) and (13), $\mathcal{G}$ has an order of $2^{2+1}$. Each i (corresponding to the ith qubit) is associated with operators I, $X_i$, $Y_i$, $Z_i$, and a possible overall phase factor of (-1) for these operators (which can double the number of operators for the ith qubit). In addition, the square of every element in $\mathcal{G}$ is equal to (±1). Furthermore, if A, B $\in \mathcal{G}$, then either [A,B]=0 or {A,B}=0.

The code words of a quantum error-correcting code form a coding space T which is a subspace of the $2^n$-dimensional Hilbert space. The group $\mathcal{G}$ acts on the state vectors in the subspace T. The subspace has a stabilizer H which includes tensor products of the matrices X, Y, and Z that fix every state in the coding subspace T. All of the vital information of a quantum code is contained in this stabilizer H. The stabilizer H for the coding subspace T is defined as follows, $$H = \{M \in H \text{ s.t.} M|\psi\rangle = |\psi\rangle, \forall |\psi\rangle \in T\}, \tag{14}$$

i.e, for any operator M in H, each and every state $|\psi\rangle$ in T is an eigen state of M with an eigen value of 1. Assume $E \in \mathcal{G}$ and $\exists E \in H$ s.t. $\{E,M\}=0$, then for $\forall |\psi\rangle, |\phi\rangle \in T$, the following can be obtained:

$$\langle\phi|E|\psi\rangle = \langle\phi|EM|\psi\rangle = -\langle\phi|ME|\psi\rangle = -\langle\phi|E|\psi\rangle, \tag{15}$$

which leads to $$\langle\phi|E|\psi\rangle = 0. \tag{16}$$

The implications of Equation (16) are significant. Suppose E and F are two errors, both of length of t qubits or less. Then $E|\psi\rangle$ and $F|\phi\rangle$ are orthogonal for all $|\psi\rangle, |\phi\rangle \in T$ whenever $F^\dagger E$ anticommutes with any operators in the stabilizer H.

This is the requirement for a non-degenerate code. Therefore, in order to construct a code, a space T and corresponding H are chosen in such a way that every non-trivial matrix in the group $\mathscr{G}$ of length less than or equal to 2t anticommutes with some member of the stabilizer H. A large class of quantum error-correcting codes in a basis including X, Y, and Z can be completely described by its stabilizer H.

For a given subspace T, a corresponding stabilizer H can be derived based on the states in T. However, it is easier to find codes using the above property if a stabilizer H can be chosen or determined first. Then a space T of code words can be deduced based on the chosen stabilizer H.

1. PROPERTIES OF STABILIZER H

The stabilizer H is a subgroup of the group $\mathscr{G}$ that act on the $2^n$-dimensional Hilbert space. By definition of H in Equation (14), if an operator (or "generator") M belongs to H, then $$M^2|\psi> = M|\psi> = |\psi>, \tag{17}$$

i.e., M cannot square to $-1$. Furthermore, if M, N$\in$H, then $$MN|\psi> = |\psi>, \tag{18}$$

$$NM|\psi> = |\psi>, \tag{19}$$

and $$[M,N]|\psi> = (MN-NM)|\psi> = 0. \tag{20}$$

If $\{M,N\}=0$, then $[M,N]=2MN$. Since M and N are unitary which cannot have 0 eigenvalues, so $[M,N]=0$. Therefore, the stabilizer H is abelian, i.e., all operators in H commute with one another.

Thus, H must be abelian and every element of H must square to 1. For some value a<n, H is isomorphic to $(Z_2)^a$ where $Z_2$ represents a binary space of 0s and 1s. The above requirements on H are sufficient conditions for constructing a non-trivial space T with the stabilizer H. The largest coding subspace T with the stabilizer H has a dimension of $2^{n-a}$.

2. CONSTRUCTION OF CODING SPACE T WITH STABILIZER H

An algorithm for constructing a basis for T with a chosen stabilizer H is described as follows. Intuitively, $2^{n-a}$ should be the dimension of the coding subspace T since each generator of H has eigenvalues $\pm 1$ and splits T in half. Either of code words corresponding to the eigenvalue of (+1) and the ones corresponding to the eigenvalue of (−1) can be used. The former is used in this disclosure.

Consider a state that can be written as a tensor product of 0s and 1s. Such a state is analogous to one word of a classical code and may be referred to as a "quasi-classical" state. For a given quasi-classical state $|\phi>$, the operators M in H can be used to produce a state $|\psi>$ that is still in T:

$$|\Psi> = \sum_{M \in H} M|\phi>, \tag{21}$$

because applying an element of H to $|\phi>$ simply rearranges the sum. In general, $|\phi>$ does not need to be a quasi-classical state for $|\psi>$ to be in T. Any state may be used but quasi-classical states are used for convenience and simplicity.

The state $|\phi>$ is a seed of the code word $|\psi>$. If M$\in$H, M$|\phi>$ can also act as the seed for the same quantum code word as $|\phi>$. Not every possible seed can produce a non-zero code word. For instance, suppose H=$\{I, Z_1Z_2\}$ and $|01>$ is used as the seed, then $|\psi> = I|01> + Z_1Z_2|01> = 0$.

To construct elements of the coding subspace T, many quasi-classical states are tested until a quasi-classical state is found to produce a non-zero $|\psi_1>$. It can be shown that such a state always exists. The non-zero $|\psi_1>$ can be written as a sum of quasi-classical states, any of which could act as its seed. To construct another non-zero code word $|\psi_2>$, a quasi-classical state that does not appear in $|\psi_1>$ and does not produce 0 is used as a seed to produce the state $|\psi_2>$. The above process is repeated for all possible quasi-classical states to construct the states $|\psi_i>$ which form a basis for T. This process ensures that the states $|\psi_i>$ do not share a common quasi-classical state.

The following will examine whether $\{|\psi_i>\}$ is indeed a basis for T. Imagine the elements of H are built up by adding generators one by one. Suppose H=$<M_1,M_2,\ldots,M_a>$, i.e., H is generated by $M_1$ through $M_a$. Let $H_r$ be the group generated by $M_1$ through $M_r$. $H_r$ can be used to act on a selected quasi-classical seed $|\phi>$ to produce a set $S_r$ of quasi-classical states. The phases of these quasi-classical states will matter. The next generator $M_{r+1}$ can do one of three things: (1) to map the seed $|\phi>$ to some new quasi-classical state not in $S_r$ (type 1 generator); (2) to map the seed $|\phi>$ to plus or minus itself (type 2 generator), a phase factor of 0 or $\pi$; or (3) to map the seed $|\phi>$ to plus or minus multiplied by some state in $S_r$ other than the seed $|\phi>$ (type 3 generator).

In the case (1), all of the elements of $H_{r+1}-H_r$ will also map the seed outside of $S_r$: if N$\in H_{r+1}-H_r$, then N=M$M_{r+1}$ for some M$\in H_r$. Then if $\pm N|\phi> \in S_r$, $N|\phi> = \pm M'|\phi>$ for some M'$\in H_r$. Then, $M_{r+1}|\phi> = \pm M^{-1}M'|\phi> \in S_r$. This contradicts the assumption. Thus, $S=S_a$ will always have a size of $2^b$, where b is the number of type 1 generators.

In the second case (2), the new generator must act on each qubit as the identity I, as $-I$, or as $Z_i$, so type 2 generators can be written as the product of Z's. In principle, a type 2 generator could be (−1) times the product of Z's, but the factor of (−1) slightly complicates the process of picking seeds. For simplicity, it is assumed that the factor (−1) is not present. The method of choosing H as described below create generators without such factors of (−1).

In the third case (3), when $|\phi'> = \pm M_{r+1}|\phi>$ is already in $S_r$, then an operator N$\in H_r$ can be found so that $N|\phi> = |\phi'>$. $N^{-1}M_{r+1}$ can be used as a new generator instead of $M_{r+1}$. Since $N^{-1}M_{r+1}|\phi> = \pm|\phi>$, this becomes the case (2). After adding all of the generators and changing any of type 3 operators into type 2 operators, the final result is b generators of type 1 and (a−b) generators of type 2.

If one of the type 2 generators $M_i$ that acts on a seed produces a factor of (−1), the final state is 0:

$$\sum_{M \in H} M \left| \Psi > = \left( \sum_{M \in H} M \right) M_i \right| \phi > = - \sum_{M \in H} M \left| \phi > = 0. \tag{22}$$

Otherwise $|\psi>$ is non-zero. The computation of $|\psi>$ can be simplified by summing over only the products of the type 1 generators, since the type 2 generators simply produce additional copies of the same sum. Then $|\psi>$ will be the sum of $2^b$ quasi-classical states (with the appropriate signs).

In the above classification of generators, any operator that is a product of Z's has only quasi-classical states as the eigenstates, and anything that is not a product of Z's has no quasi-classical states as eigenstates. Thus if a generator is type 2 for one seed, it is type 2 for all seeds. Type 1 generators cannot become type 3 generators because the matrix $M^{-1}N$ would otherwise be type 2 for some states but not others. Thus, all of the states $|\psi>$ are the sum of $2^b$ quasi-classical states, and (a−b) of the generators of H are the product of Z's. The classification of generators into type 1 and type 2 generators does not depend on their order.

Since a seed produces a non-trivial final state if and only if the seed has an eigenvalue of +1 for all of the type 2 generators, all of the states $|\psi_i\rangle$ live in the joint +1 eigenspace of dimension $2^{n-(a-b)}$ for the (a−b) type 2 generators. The quasi-classical basis states of this eigenspace can be partitioned into classes based on the $|\psi_i\rangle$ in which the states appear. Each partition has size $2^b$, so there are $2^{n-a}$ partitions. This proves the claimed dimension of T. Thus, the states $|\psi_i\rangle$ indeed form a basis of T.

The task of finding seeds for a basis of quantum code words can be simplified. First, $|0\rangle = |00 \ldots 0\rangle$ is always in the +1 eigenspace of any type 2 generator, so $|0\rangle$ can always be used as the first seed. Any other quasi-classical seed $|\phi\rangle$ can be produced from $|0\rangle$ by operating with some $N\in\mathcal{G}$ that is a product of X's. For $N|0\rangle$ to act as the seed for a non-trivial state, N should commute with every type 2 generator in H:

$$M_i(N|0\rangle) = -NM_i|0\rangle = -N|0\rangle, \quad (23)$$

where $M_i$ is a type 2 generator in H and $\{N, M_i\} = 0$. Since only quasi-classical states which have an eigenvalue of +1 produce non-trivial code words, N should commute with the type 2 generators. Two such operators N and N' can be used to produce seeds for the same quantum code word if N and N' differ by an element of H, i.e., $N^{-1}N' \in H$. This provides a test for determination of when two seeds will produce different code words. This also indicates that the product of two operators producing different code words will also be a new code word. Thus, a full set of $2^{n-a}$ seeds can be generated by taking products of (n−a) operators $N_1, N_2, \ldots N_{n-a}$. Therefore, the (n−a) operators $\{N_i\}$ are called "seed generators".

Once the generators $M_i$ of H and the seed generator $N_i$ are determined, a unitary transformation can be defined to perform the encoding as follows:

$$\left| c_1 c_2 \ldots c_k \right\rangle \mapsto \frac{1}{2^{b/2}} \prod_{M_1 \text{type} 1} (I + M_i) N_1^{c_1\theta} N_2^{c_2\theta} \ldots N_k^{c_k\theta} \left| 0 \right\rangle. \quad (24)$$

3. CONSTRUCTION OF STABILIZER H

Every non-trivial matrix in the group $\mathcal{G}$ of length less than or equal to 2t should anticommute with some element of the stabilizer H in order to correct errors of t qubits. A stabilizer H can be designed to meet this criterion.

For a given operator M in the group $\mathcal{G}$ consider a binary function $f_M: \mathcal{G} \to Z_2$, $$f_m(N) = \begin{cases} 0 \text{ if } [M, N] = 0, \\ 1 \text{ if } \{M, N\} = 0. \end{cases} \quad (25)$$

This function $f_M$ is a homomorphism that maps multiplications of operators in the group $\mathcal{G}$ to additions of binary states in the binary space $Z_2$. In addition, the function $f_M$ also functions as an error syndrome to indicate and classify the errors caused by actions of the operators in the group $\mathcal{G}$ on any of the original $2^k$ quantum states. For a stabilizer $H = \langle M_1, M_2, \ldots M_a \rangle$, a respective error syndrome function $f: \mathcal{G} \to (Z_2)^a$ is defined by:

$$f(N) = (f_{M_0}(N), f_{M_0}(N), \ldots f_{M_Y}(N)). \quad (26)$$

The function f(N) can be written as an a-bit binary string with f(N)=00 . . . 00 if N commutes with every element in H. Each bit in f(N) corresponds to a generator $M_i$ (i=1, 2, . . . , a) of the stabilizer H. H may be constructed so that f(E) is non-zero for any error E up to a length of 2t. Any such error E can be written as a product of errors F and G, each of length t or less. f(E) is non-zero if $f(F) \neq f(G)$.

Therefore, H is configured so that f(F) is different for each error F of length t or less.

A quantum error-correcting code can be formed by first choosing a different a-bit binary number for each $X_i$ and $Z_i$. These numbers will be the values of $f(X_i)$ and $f(Z_i)$ for a stabilizer H which can be subsequently determined. These binary numbers of $f(X_i)$ and $f(Z_i)$ are chosen in such a way that the corresponding values of $f(Y_i)$ and errors of length 2 or more (if t>1) are all different. While this task is difficult in general, it is tractable as illustrated below in the case for t=1. In addition, even if all values of the f(E) are different, H still needs to fix a non-trivial space T of code words by requiring H be abelian and the respective elements square to +1.

FIG. 1 is a flowchart 100 showing the primary operation steps in forming a quantum error-correcting code. At step 102, a complete set of basis operators is selected (e.g., X, Y, Z, and I) to act on quantum states in a Hilbert space and a coding subspace. At step 104, error syndromes for the operators corresponding to errors up to a specified length are selected such as $f(X_i)$, $f(Z_i)$, and $f(Y_i)$. Next at step 106, operators of a stabilizer for the coding subspace are determined according to the error syndromes. Finally at step 108, the operator of the stabilizer are used to act on a plurality of different seed states (e.g., quasi-classical states) to form basis states for the coding subspace. Code words are formed by the basis states or any linear combination of the basis states.

4. CONSTRUCTION OF QUANTUM CODES OF $N=2^j$ QUBITS

The above method for forming a code is now demonstrated by constructing an optimal non-degenerate quantum error-correcting code of $n=2^j$ for correcting t=1 error. The operators X, Y, Z, and I as defined in Equations (9)–(13) are used to form the Hilbert space. The quantum Hamming bound expressed in Equation (7) dictates that $$k \leq n - j - 2. \quad (27)$$

Assume an abelian stabilizer H is isomorphic to $(Z_2)^a$ for $a = j+2$ and $j \geq 3$. Specifically, assume j=3 so that n=8. Further, k is chosen to saturate the Hamming bound, i.e., k=n−j−2= 8−3−2=5.

Different (j+2)-bit binary numbers $f(X_i)$ and $f(Z_i)$ are respectively chosen for $X_i$ and $Z_i$ (i=1, 2, . . . n) so that the numbers $f(Y_i)$ for $Y_i$ are also different from one another. The numbers $f(Y_i)$ are obtained by the bitwise XOR of the numbers for $X_i$ and $Z_i$.

TABLE I

The values of $f(X_i)$, $f(Y_i)$, and $f(Z_i)$ for n = 8.

| $X_1$ | 01000 | $X_2$ | 01001 | $X_3$ | 01010 | $X_4$ | 01011 |
|---|---|---|---|---|---|---|---|
| $Z_1$ | 10111 | $Z_2$ | 10000 | $Z_3$ | 10110 | $Z_4$ | 10001 |
| $Y_1$ | 11111 | $Y_2$ | 11001 | $Y_3$ | 11100 | $Y_4$ | 11010 |
| $X_5$ | 01100 | $X_6$ | 01101 | $X_7$ | 01110 | $X_8$ | 01111 |
| $Z_5$ | 10010 | $Z_6$ | 10101 | $Z_7$ | 10011 | $Z_8$ | 10100 |
| $Y_5$ | 11110 | $Y_6$ | 11000 | $Y_7$ | 11101 | $Y_8$ | 11011 |

One example for the numbers $f(X_i)$, $f(Y_i)$ and $f(Z_i)$ for n=8 and all of the 1-qubit errors are shown in Table I. The first two bits are chosen to distinguish between the X's, the Y's, and the Z's and the remaining j bits are designated to identify which qubit i the error acts on. The latter also depends on whether the error is an X, a Y, or a Z. Specifically, the first two bits are 01 for an X, 10 for a Z, and 11 for a Y, as required to make f a homomorphism. For the $X_i$'s, the last j bits are used form the binary number for i–1, so $X_1$ is 0100 . . . 0, and Xn is 0111 . . . 1. The encoding for the last j bits for the $Z_i$'s is more complicated. The number pattern for $X_i$'s cannot be used, or all of the $Y_i$'s would just have all 0s for the last j bits. Instead of counting 0, 1, 2, 3, . . . , we instead count 0, 0, 1, 1, 2, 2, . . . . Writing this in binary does not make all of the numbers for the Z's different. One way to obtain the numbers for the $Z_i$'s is to write the numbers in binary and then take the bitwise NOT of one of each pair. This indeed makes all of the Z's different.

Which member of the pair is inverted will determine whether all of the numbers for $Y_i$ are different. For even j, the NOT for all odd i can be used; but for odd j, the NOT is taken for odd i when $i \leq 2^{j-1}$ and for even i when $i > 2^{j-1}$. This method can be proven to produce different numbers for all the $Y_i$'s.

Figure 2:
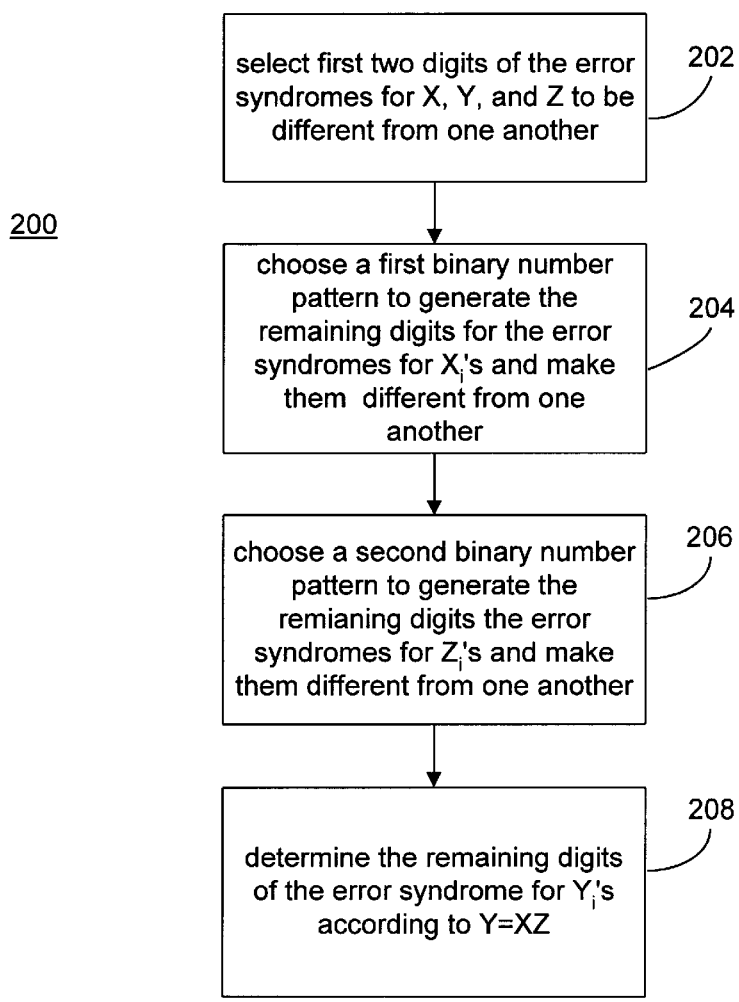
FIG. 2 is a flowchart showing construction of error syndromes for operators X, Y, Z, and I.

The above example of producing the numbers for X's, Y's and Z's can be generally described by the flowchart 200 in FIG. 2. In essence, two different binary number patterns are used to generate different numbers for both $X_i$'s and $Z_i$'s. The two patterns are chosen so that the binary numbers for $Y_i$'s that are generated based on Equation (12) are also different.

Next, the generators $M_1, \ldots M_a$ of the stabilizer H are determined. Recall that the first digit of the binary numbers corresponds to the first generator. Since the first digit of the number for $X_1$ is 0, $M_1$ commutes with $X_1$, the first digits of the numbers for $Y_1$ and $Z_1$ are both 1. Thus, $M_1$ anticommutes with $Y_1$ and $Z_1$. Therefore, $M_1$ is $X_1$ multiplied by the product of matrices which only act on the other qubits. Similarly, the first digit of the number for each $X_i$ is 0 and the first digits for $Y_i$ and $Z_i$ are both 1. This leads to $M_1 = X_1 \cdot X_2 \cdot \ldots X_n$ (this is true even for j>3). Other generators can be similarly constructed using the same principle.

The results for n=8 are summarized in Table II. All of these generators square to +1 and commute with one another. Thus, a code is formed to encode 3 qubits in 8 qubits, or more generally (n–j–2) qubits in $2^j$ qubits. For these codes, there is 1 type 2 generator $M_2$ while the remaining (j+1) generators are type 1.

TABLE II

The generators of H and seed generators for n = 8.

| | | | | | | | | |
|---|---|---|---|---|---|---|---|---|
| $M_1$ | $X_1$ | $X_2$ | $X_3$ | $X_4$ | $X_5$ | $X_6$ | $X_7$ | $X_8$ |
| $M_2$ | $Z_1$ | $Z_2$ | $Z_3$ | $Z_4$ | $Z_5$ | $Z_6$ | $Z_7$ | $Z_8$ |
| $M_3$ | $X_1$ | I | $X_3$ | I | $Z_5$ | $Y_6$ | $Z_7$ | $Y_8$ |
| $M_4$ | $X_1$ | I | $Y_3$ | $Z_4$ | $X_5$ | I | $Y_7$ | $Z_8$ |
| $M_5$ | $X_1$ | $Z_2$ | I | $Y_4$ | I | $Y_6$ | $X_7$ | $Z_8$ |
| $N_1$ | $X_1$ | $X_2$ | I | I | I | I | I | I |
| $N_2$ | $X_1$ | I | $X_3$ | I | I | I | I | I |
| $N_3$ | $X_1$ | I | I | I | $X_5$ | I | I | I |

Table II also lists seed generators $N_1$, $N_2$, and $N_3$ for n=8. These seed generators all commute with $M_2$, the type 2 generator. In addition, these seed generators all produce seeds for different states.

TABLE III

The quantum code words for the n = 8 code.

$|\psi_0\rangle =$ |00000000> + |11111111> + |10100101> + |10101010> + |10010110> + |01011010> + |01010101> + |01101001> + |00001111> + |00110011> + |00111100> + |11110000> + |11001100> + |11000011> + |10011001> + |01100110>

$|\psi_1\rangle =$ |11000000> + |00111111> + |01100101> + |01101010> – |01010110> + |10011010> + |10010101> – |10101001> + |11001111> – |11110011> – |11111100> + |00110000> – |00001100> " |00000011> – |01011001> – |10100110>

$|\psi_2\rangle =$ |10100000> + |01011111> + |00000101> – |00001010> + |00110110> + |11111010> + |11110101> + |11001001> – |10101111> + |10010011> – |10011100> – |01010000> + |01101100> – |01100011> – |00111001> – |11000110>

$|\psi_3\rangle =$ |01100000> + |10011111> + |11000101> – |11001010> + |11110110> + |00111010> + |00110101> – |00001001> – |01101111> + |01010011> – |01011100> – |10010000> – |10101100> + |10100011> + |11111001> + |00000110>

$|\psi_4\rangle =$ |10001000> + |01110111> – |00101101> + |00100010> + |00011110> – |11010010> + |11011101> + |11100001> – |10000111> – |10111011> + |10110100> – |01111000> – |01000100> + |01001011> – |00010001> – |11101110>

$|\psi_5\rangle =$ |01001000> + |10111111> – |11101101> + |11100010> – |11011110> – |00010010> + |00011101> – |00100001> – |01000111> + |01111011> – |01110100> – |10111000> + |10000100> – |10001011> + |11010001> + |00101110>

$|\psi_6\rangle =$ |00101000> + |11010111> – |10001101> – |10000010> + |10111110> – |01110010> – |01111101> + |01000001> + |00100111> – |00011011> – |00010100> + |11011000> – |11100100> + |11101011> + |10110001> + |01001110>

$|\psi_7\rangle =$ |11101000> + |00010111> – |01001101> – |01000010> – |01111110> – |10110010> – |10111101> + |10000001> – |10000111> + |11100111> + |11011011> + |11010100> + |00011000> + |00100100> + |00101011> – |01110001> – |10001110>

Table III lists 8 different quantum code words that are formed by using the seed generators. Thus, these seed generators actually form a complete list of seed generators. The quantum Hamming bound for 1 error can be saturated for arbitrarily large n.

The quantum codes in Table III are produced from Table II using Equation (21). For example, the seed is chosen as $|\phi\rangle = |00000000\rangle$ for $|\psi_0\rangle$. This seed is chosen to be a +1 eigenstate of the operator $M_2$, which is the product of $Z_i$ operators and is therefore a type 2 generator. After choosing $|\phi\rangle$ for $|\psi_0\rangle$, all the elements in the stabilizer H can be derived. We need not include anything derived from the type 2 generator $M_2$, so we only work out the 16 elements I, $M_1$, $M_3$, $M_4$, $M_5$, $M_1M_3$, $M_1M_4$, $M_1M_5$, $M_3M_4$, $M_3M_5$, $M_4M_5$, $M_1M_3M_4$, $M_1M_3M_5$, $M_1M_4M_5$, $M_3M_4M_5$, and $M_1M_3M_4M_5$. For instance, $$M_1M_3M_5 = X_1Y_2IZ_4Y_5X_6Z_7I. \quad (28)$$

Then we apply each of these sixteen operators to the seed $|\phi\rangle$ in turn to produce the sixteen kets. $|\psi_0\rangle$ is simply the sum of the sixteen kets. For instance, $$M_1M_3M_5|00000000\rangle = |11001100\rangle, \quad (29)$$

which is the second ket in the third row for $|\psi_0\rangle$. The remaining basis code words $|\psi_1\rangle$ through $|\psi_7\rangle$ are produced by using the seed generators $N_1$, $N_2$, and $N_3$ and their products. For instance, the seed for $|\psi_3\rangle$ is $$|01100000\rangle = N_1N_2|00000000\rangle. \quad (30)$$

The other kets in $|\psi_3\rangle$ are again produced by applying the same 16 elements from H.

Based on a given original code such as the one in Table III, a number of different codes that are trivially related to the original code can be generated. An arbitrary reordering of the qubits of the original code may appear to produce a different code but such a seemly different code still corrects the same number of errors, encodes the same number of qubits, and shares all other properties with the original code. Such a code is said to be equivalent to the original code. For instance, switching the first and second qubits of the 8-qubit code gives another 8-qubit code that is equivalent to the one in Table III. Similarly, any rotation of a single qubit (or multiple independent rotations of a number of qubits) will also produce an equivalent code.

Quantum error-correcting codes formed based on the above stabilizer formalism have a number of advantages. For example, for a given stabilizer, a simple procedure can be used to create a network to encode data using the code. See, Cleve and Gottesman, "Efficient computations of encoding for quantum error correction," Phys. Rev. A 56, p. 76 (1997), which is incorporated herein by reference. A simple method of measuring the error syndrome for a stabilizer code is also available. See, DiVincenzo and Shor, "Fault-tolerant error correction with efficient quantum codes," Phys. Rev. Lett. 77, p. 3260 (1996), which is incorporated herein by reference. Furthermore, a universal set of gates can be performed in a fault-tolerant manner for any such code to ensure that the process of computation does not cause errors to propagate out of control. This is disclosed by Gottesman, "A theory of fault-tolerant quantum computation," Phys. Rev. A 57, p. 127 (1998), which is incorporated herein by reference. The $n=2^j$ codes disclosed here have all of these advantages, plus it is straightforward to efficiently compute the error from the error syndrome, a property which is essential for any large code to be practically useful.

Figure 3:
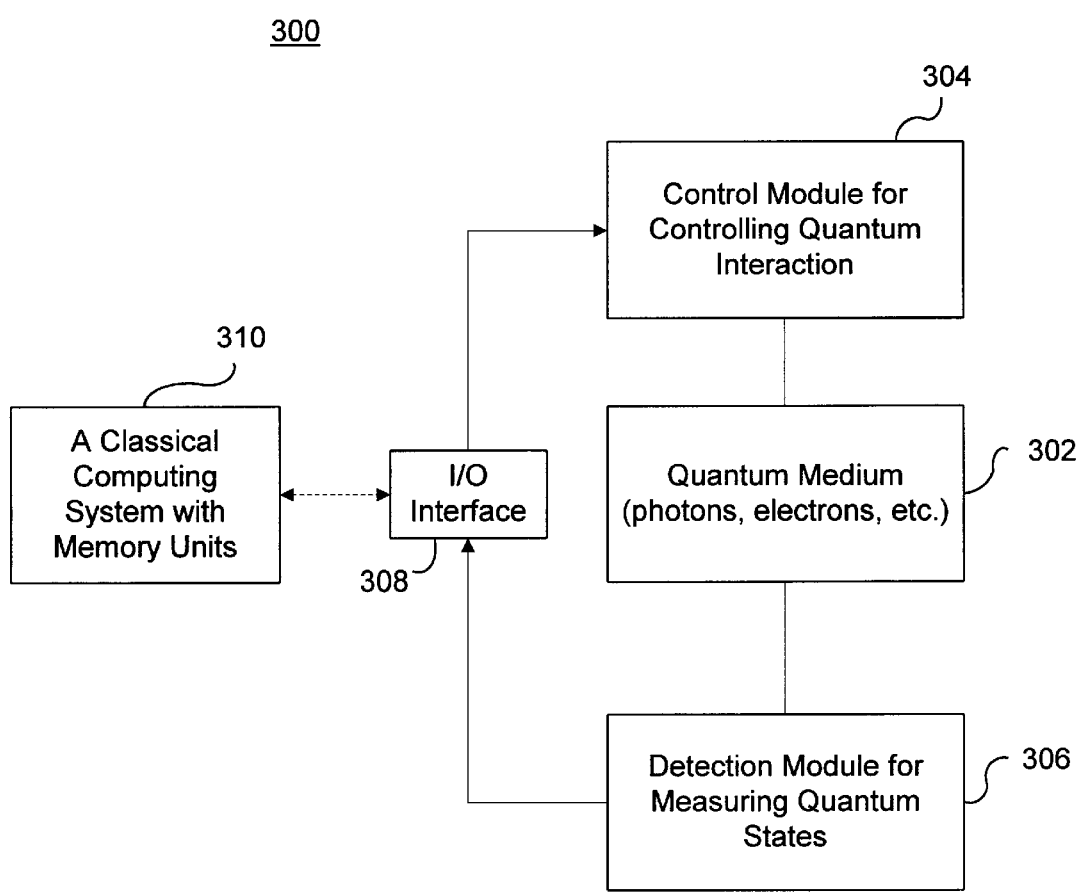
FIG. 3 is a block diagram showing a quantum information processing device in accordance with the invention.

FIG. 3 shows a quantum device 300 for information processing that implements the quantum error-correcting codes in accordance with the invention. The quantum device 300 includes a medium 302 that hosts an ensemble of quantum particles (e.g., photons, electrons, etc.) each having at least two quantum states, a control module 304 for controlling the quantum states in the medium 302, and a detection module 306 for measuring the quantum states in the medium 302. An input/output interface 308 is used to feed input parameters or data to the medium 302 and to send out the results from the detection module 306. The quantum device 300 may be a CPU of a computing system or a quantum data encoding/decoding device in a computer system or a communication channel. In particular, a classical computing system 310 with memory units may be connected to the interface 308 to control the operation of the control module 304 in certain implementations.

The control module 304 is configured to provide a means for interacting with one or more quantum particles and for promoting interactions among the quantum particles in a controllable manner. Based on the medium 302 that is used, the control module 304 may be in a variety of configurations such as electromagnetic radiation to induce transitions between different states as in laser-atom interactions and nuclear magnetic resonance. The interactions among the quantum particles in a controllable manner are necessary since entanglement of quantum states is used in quantum information processing.

The quantum error-correcting codes are implemented within the medium 302 by using the control module 304, such as the code shown in Table III.

Although the present invention has been described in detail with reference to a few embodiments, various modifications and enhancements may be made without departing from the scope and spirit of the following claims.

What is claimed is:

1. A method of forming a quantum error-correcting code for a quantum information processing system, comprising:

selecting quantum basis operators operable to act upon quantum states in a specified space and to represent an arbitrary operator which is applicable to said specified space;

determining error syndromes indicative of errors caused by operations and perturbations on any of said quantum states in said specified space, wherein said operation and perturbations can be represented by combinations of said basis operators;

forming a plurality of stabilizer operators for a coding subspace of said specified space according to said error syndromes in such a way that said stabilizer operators are operable to detect and correct said errors, wherein said stabilizer operators commute with one another and an eigen value of a square of each of said stabilizer operators in said specified space is +1; and constructing code words in said coding subspace by using said stabilizer operators to operate on a plurality of selected states.

2. A method as in claim 1, wherein said basis operators are either commuting or anticommuting with one another.

3. A method as in claim 2, wherein an eigenvalue of a square of each of said basis operators in said specified space is either +1 or −1.

4. A method as in claim 1, wherein said error syndromes are in a binary form.

5. A method as in claim 1, wherein said errors have a length less than a specified error length.

6. A method as in claim 1, wherein said error syndromes are different from one another.

7. A method as in claim 1, wherein said code words saturate the Hamming bound.

8. A method as in claim 1, wherein said basis operators include:

$$X = \begin{pmatrix} 0 & 1 \\ 1 & 0 \end{pmatrix}, Y = \begin{pmatrix} 0 & -1 \\ 1 & 0 \end{pmatrix}, Z = \begin{pmatrix} 1 & 0 \\ 0 & -1 \end{pmatrix}, I = \begin{pmatrix} 1 & 0 \\ 0 & 1 \end{pmatrix}.$$

9. A method as in claim 8, wherein said error syndromes are binary numbers and determined by:

selecting first two digits of each error syndrome for X, Y, and Z in a way to distinguish Z, Y, and Z;

choosing a first binary number pattern to generate different remaining digits of error syndromes for X acting on different quantum states in said specified space;

choosing a second binary number pattern to generate different remaining digits of error syndromes for Z acting on different quantum states in said specified space; and determining remaining digits of error syndromes for Y acting on different quantum states in said specified space according to a relation that associates Y to X and Z.

10. A method as in claim 9, wherein said specified space has a dimension of $2^n$ and includes n quantum bits, where n is an integer.

11. A method as in claim 10, wherein said code words for correcting 1 error for 3 quantum bits by encoding said 3 quantum bits in 8 quantum bits include:

|ψ₀> = |00000000> + |11111111> + |10100101> + |10101010> +
       |10010110> + |01011010> + |01010101> + |01101001> +
       |00001111> + |00110011> + |00111100> + |11110000> +
       |11001100> + |11000011> + |10011001> + |01100110>

|ψ₁> = |11000000> + |00111111> + |01100101> + |01101010> −
       |01010110> + |10011010> + |10010101> − |10101001> +
       |11001111> − |11110011> − |11111100> + |00110000> −
       |00001100> " |00000011> − |01011001> − |10100110>

|ψ₂> = |10100000> + |01011111> + |00000101> − |00001010> +
       |00110110> + |11111010> − |11110101> + |11001001> −
       |10101111> + |10010011> − |10011100> − |01010000> +
       |01101100> − |01100011> − |00111001> − |11000110>

|ψ₃> = |01100000> + |10011111> + |11000101> − |11001010> +
       |11110110> + |00111010> − |00110101> + |00001001> −
       |01101111> + |01010011> + |01011100> − |10010000> −
       |10101100> + |10100011> + |11111001> + |00000110>

|ψ₄> = |10001000> + |01110111> − |00101101> + |00100010> +
       |00011110> − |11010010> + |11011101> + |11100001> −
       |10000111> − |10111011> + |10110100> − |01111000> −
       |01000100> + |01001011> − |00010001> − |11101110>

|ψ₅> = |01001000> + |10110111> − |11101101> + |11100010> −
       |11011110> − |00010010> + |00011101> − |00100001> −
       |01000111> + |01111011> − |01110100> − |10111000> +
       |10000100> − |10001011> + |11010001> + |00101110>

|ψ₆> = |00101000> + |11010111> − |10001101> − |10000010> +
       |10111110> − |01110010> − |01111101> + |01000001> +
       |00100111> − |00011011> − |00010100> + |11011000> −
       |11100100> − |11101011> + |10110001> + |01001110>

|ψ₇> = |11101000> + |00010111> − |01001101> − |01000010> −
       |01111110> − |10110010> − |10111101> − |10000001> +
       |11100111> + |11011011> + |11010100> + |00011000> +
       |00100100> + |00101011> − |01110001> − |10001110>.

12. A quantum information processing device, comprising:
   a medium having an ensemble of quantum particles which each have at least two quantum states;
   a control module configured to control quantum states in said medium at least in part based on a stabilizer-generated error-correcting code;
   a detection module configured to measure said quantum states in said medium; and
   an input/output interface operable to feed input parameters to said medium and to receive information indicative of said quantum states from said detection module.

13. A device as in claim 12, wherein said error-correcting code is formed by:
   selecting a set of quantum basis operators operable to act upon a Hilbert space formed by said quantum states and to represent an arbitrary operator which is applicable to said Hilbert space;
   determining error syndromes indicative of errors caused by operations and perturbations on any of said quantum states in said Hilbert space, wherein said operation and perturbations can be represented by combinations of said basis operators and said error syndromes are functions that transform multiplications of two operators for said Hilbert space to additions of binary numbers in a binary space;
   forming a plurality of stabilizer operators for a coding subspace of said Hilbert space according to said error syndromes in such a way that said stabilizer operators are operable to detect and correct said errors; and
   constructing code words in said coding subspace by using said stabilizer operators to operates on a plurality of seed states.

14. A device as in claim 13, wherein said basis operators are either commuting or anticommuting with one another.

15. A device as in claim 13, wherein an eigen value of a square of each of said basis operators in said Hilbert space is either +1 or −1.

16. A device as in claim 13, wherein said basis operators include:

$$X = \begin{pmatrix} 0 & 1 \\ 1 & 0 \end{pmatrix}, Y = \begin{pmatrix} 0 & -1 \\ 1 & 0 \end{pmatrix}, Z = \begin{pmatrix} 1 & 0 \\ 0 & -1 \end{pmatrix}, I = \begin{pmatrix} 1 & 0 \\ 0 & 1 \end{pmatrix}.$$

17. A device as in claim 13, wherein said error syndromes are determined by:
   selecting first two digits of each error syndrome for X, Y, and Z in such a way to distinguish X, Y, and Z;
   choosing a first binary number pattern to generate different remaining digits of error syndromes for X acting on different quantum states in said Hilbert space;
   choosing a second binary number pattern to generate different remaining digits of error syndromes for Z acting on different quantum states in said Hilbert space; and
   determining remaining digits of error syndromes for Y acting on different quantum states in said Hilbert space according to a relation that associates Y to X and Z.

18. A device as in claim 17, wherein said Hilbert space has a dimension of $2^n$ and includes n quantum bits, where n is an integer.

19. A device as in claim 18, wherein said code words for correcting 1 error for 3 quantum bits by encoding said 3 quantum bits in 8 quantum bits include:

|ψ₀> = |00000000> + |11111111> + |10100101> + |10101010> +
       |10010110> + |01011010> + |01010101> + |01101001> +
       |00001111> + |00110011> + |00111100> + |11110000> +
       |11001100> + |11000011> + |10011001> + |01100110>

|ψ₁> = |11000000> + |00111111> + |01100101> + |01101010> −
       |01010110> + |10011010> + |10010101> − |10101001> +
       |11001111> − |11110011> − |11111100> + |00110000> −
       |00001100> " |00000011> − |01011001> − |10100110>

|ψ₂> = |10100000> + |01011111> + |00000101> − |00001010> +
       |00110110> + |11111010> − |11110101> + |11001001> −
       |10101111> + |10010011> − |10011100> − |01010000> +
       |01101100> − |01100011> − |00111001> − |11000110>

|ψ₃> = |01100000> + |10011111> + |11000101> − |11001010> +
       |11110110> + |00111010> − |00110101> + |00001001> −
       |01101111> + |01010011> + |01011100> − |10010000> −
       |10101100> + |10100011> + |11111001> + |00000110>

|ψ₄> = |10001000> + |01110111> − |00101101> + |00100010> +
       |00011110> − |11010010> + |11011101> + |11100001> −
       |10000111> − |10111011> + |10110100> − |01111000> −
       |01000100> + |01001011> − |00010001> − |11101110>

|ψ₅> = |01001000> + |10110111> − |11101101> + |11100010> −
       |11011110> − |00010010> + |00011101> − |00100001> −
       |01000111> + |01111011> − |01110100> − |10111000> +
       |10000100> − |10001011> + |11010001> + |00101110>

|ψ₆> = |00101000> + |11010111> − |10001101> − |10000010> +
       |10111110> − |01110010> − |01111101> + |01000001> +
       |00100111> − |00011011> − |00010100> + |11011000> −
       |11100100> − |11101011> + |10110001> + |01001110>

|ψ₇> = |11101000> + |00010111> − |01001101> − |01000010> −
       |01111110> − |10110010> − |10111101> − |10000001> +
       |11100111> + |11011011> + |11010100> + |00011000> +
       |00100100> + |00101011> − |01110001> − |10001110>.

\* \* \* \* \*